United States Patent [19]
Greene

[11] Patent Number: 5,940,067
[45] Date of Patent: *Aug. 17, 1999

[54] REDUCED MEMORY INDEXED COLOR GRAPHICS SYSTEM FOR RENDERED IMAGES WITH SHADING AND FOG EFFECTS

[75] Inventor: Spencer H. Greene, Palo Alto, Calif.

[73] Assignee: Alliance Semiconductor Corporation, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/574,310

[22] Filed: Dec. 18, 1995

[51] Int. Cl.$^6$ .............................. G09G 5/06; G06F 12/00
[52] U.S. Cl. ......................... 345/199; 345/422; 345/431
[58] Field of Search ..................................... 345/199, 186, 345/509, 508, 150, 153, 426, 431, 432, 418, 139, 429, 430, 507, 510, 113, 154, 147, 302, 328

[56] References Cited

U.S. PATENT DOCUMENTS

| | | | |
|---|---|---|---|
| 4,769,632 | 9/1988 | Work et al. | 345/199 |
| 4,808,988 | 2/1989 | Burke et al. | 345/16 |
| 5,068,644 | 11/1991 | Batson et al. | 345/199 |
| 5,097,427 | 3/1992 | Lathrop et al. | 395/130 |
| 5,227,863 | 7/1993 | Bilbrey et al. | 345/302 |
| 5,327,509 | 7/1994 | Rich | 345/430 |
| 5,339,386 | 8/1994 | Sodenberg et al. | 345/422 |
| 5,363,475 | 11/1994 | Baker et al. | 345/431 |
| 5,388,206 | 2/1995 | Poulton et al. | 345/507 |
| 5,459,823 | 10/1995 | Silvenbrook et al. | 345/430 |
| 5,548,709 | 8/1996 | Hannah et al. | 345/510 |
| 5,604,514 | 2/1997 | Hancock | 345/153 |
| 5,724,561 | 3/1998 | Tarolli et al. | 345/501 |
| 5,767,856 | 6/1998 | Peterson et al. | 345/422 |

*Primary Examiner*—Jeffery Brier
*Assistant Examiner*—Paul A. Bell
*Attorney, Agent, or Firm*—Limbach & Limbach LLP

[57] ABSTRACT

In one embodiment, a computer graphics system (100) stores pixel data in a combined look-up table value/lighting modulation value format (RLUT8L4) in a display back buffer (110). Data in the back buffer (110) are transferred to a front buffer (112) by a look-up and modify bit block transfer operation (LMBLT) (118). The LMBLT (118) looks up the look-up table value portion (RLUT8) of the pixel data in a render look-up table (RLUT) (116) to generate fully-lit color components of the pixel (CR, CG, CB). The color components are multiplied by the lighting value (L4) to generate a lighting modified pixel (RGB).

According to another embodiment, pixel data are stored in the back buffer (110) and a front buffer (206) in the combined format (RLUT8L4). The buffers (110 and 206) are swapped according to conventional double buffering techniques. Pixel data are used to generate analog display device control signals by a look-up and modify digital-to-analog converter (LMDAC) (312). The LMDAC 312 applies the RLUT8 to the RLUT (116) to generate fully-lit color component values, CR, CG, and CB. CR, CG, and CB are applied to a multiplier circuit (122) to generate lighting modified pixel data (RGB). The pixel data are applied to a DAC (114) which converts the pixel data into analog display control signals.

16 Claims, 4 Drawing Sheets

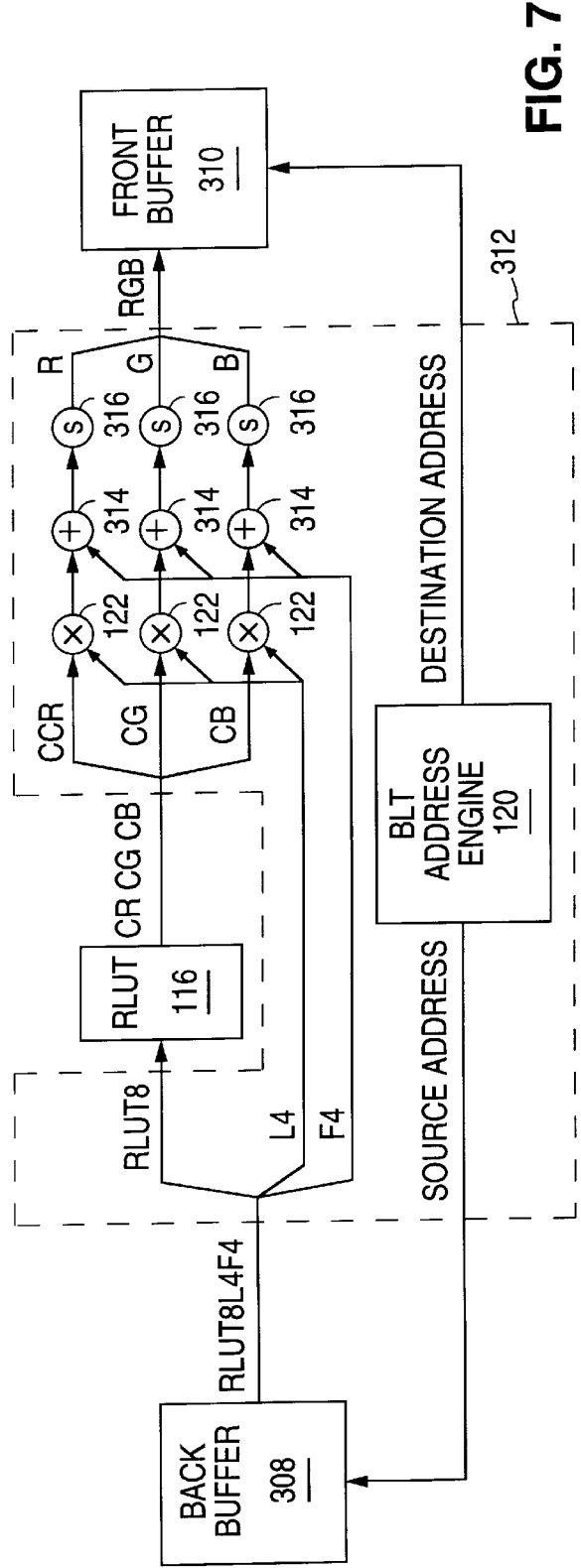

REDUCED MEMORY INDEXED COLOR GRAPHICS SYSTEM FOR RENDERED IMAGES WITH SHADING AND FOG EFFECTS

TECHNICAL FIELD

The present invention relates generally to computer graphic systems, and more particularly to computer graphics systems for displaying rendered images with various effects, such as shading and fog.

BACKGROUND OF THE INVENTION

The operation of computer display systems may be modeled in terms of an "ideal" image and a "displayed image." Such a model assumes that the ideal image is composed of ideal, infinite-precision color values at each pixel location. The display hardware serves to approximate these ideal color values, within the limits of the system hardware, to generate the displayed image. The display hardware can thus be conceptualized as a transfer function between the ideal pixel color and the displayed pixel color. In an RGB display system, this transfer function can be thought of as three separate transfer functions, each operating on one of the color components (red, green, or blue) comprising each pixel.

Displayed images are typically generated by writing pixel data to a display memory. The data in the "on-screen" portion of the display memory is then periodically read, in a serial pixel-by-pixel fashion, to display hardware. This process is referred to as screen refresh. The display hardware converts digital pixel information into analog display control information, usually by operation of a digital-to-analog converter (DAC). As a result, one inherent constraint on color variation in the display hardware is the resolution of the DAC. For example, a 24-bit DAC (typically three, 8-bit DACs) can generate $2^{24}$ distinct colors on the display screen.

A second constraint is the size of the pixel data (pixel depth or bits per pixel). The prior art includes two approaches to storing pixel data, direct color systems and indexed color systems. Direct color systems essentially quantize the ideal color to fixed precision based on the pixel depth. For 24-bit direct color systems, each color component of the pixel (red, green or blue) is quantized to 8 bits (256 discrete levels). This precision is generally considered to be sufficient to be indistinguishable to the eye from an ideal image. For 15-bit direct color systems, each color component is quantized to 5 bits. As the pixel depth decreases, more pixels are mapped to identical color values, resulting in undesirable artifacts such as "posterization", particularly when the ideal image depicts smoothly varying color intensity levels.

In an indexed color system, a set of color values are stored in a color look-up table (CLUT or palette), and software maps ideal colors to the nearest available CLUT color value. The advantage provided by indexed color systems is that the color output values are programmable. Thus, in the case of the above system, a set of 256 colors, selected from any of the 16.7 million possible colors can be loaded into the CLUT. For many images, judicious selection of the CLUT values in an 8 bpp indexed color mode can provide richer displays than a 16 bpp direct color mode.

Prior art display systems have typically addressed either continuous-tone images, such as scanned photographs, or discrete-tone images, such as text and chart displays. Continuous-tone images have been represented by 24-bit direct color; discrete-tone images have been represented using 4-bit or 8-bit indexed color systems.

Currently, in computer visualization, modeling, and gaming applications, the ability to display "rendered" images has become increasingly important. Rendered images generally involve smooth gradations of color, as they are attempts to simulate real world continuous-tone objects. In a scene, each object is typically rendered pixel-by-pixel by starting with two inputs: the color of the pixel, assuming canonical lighting conditions (i.e. fully lit, no specular reflection) and a parameter describing the actual lighting conditions at the object's position within the scene. The portion of the system rendering the pixel color can be considered a "color engine." The portion of the system describing the actual lighting conditions can be considered a "shading" engine.

A block diagram illustrating a prior art direct color rendering system is set forth in FIG. 1. The system of FIG. 1 is designated by the general reference character 10, and includes a screen update section 12 and a screen refresh section 14. Due to the animation requirements typically involved in generating rendered images, the system is "double buffered" and so the screen update section 12 includes a back buffer 16, and the screen refresh section 14 includes a front buffer 18. The back buffer 16 receives screen update information, and, when a frame render is complete, it is swapped with the front buffer 18. The data in the new front buffer is then read into display hardware. Double buffering is well understood in the art, and so will not be discussed further herein.

The screen update section 12 includes a color engine 20, a shading engine 22, a multiplier circuit 24, and the back buffer 16. A screen refresh section 14 includes the front buffer 18 and a DAC 26. The color engine 20 provides a color pixel (shown as CR, CG, CB, representing the red value, green value and blue value, respectively, of the color pixel). Concurrently, the shading engine 22 provides a lighting modulation value corresponding to the color pixel. (The lighting modulation value is shown as LR, LG and LB, which represent shading to apply to CR, CG and CB values, respectively). Each color value is modulated by its corresponding lighting value in the multiplier circuit 24. The multiplier circuit 24 generates a red, green and blue value (shown as R, G, and B) which together represent a lighting modulated direct color pixel (shown as RGB). This value is written into the back buffer 16 of the display memory.

A drawback of the direct color rendering system set forth in FIG. 1, is that an increase in colors or shading precision requires greater pixel depths, and as a result, an increase in overall display memory size.

A block diagram illustrating a prior art indexed color rendering system is set forth in FIG. 2. The system is represented by the general reference character 30 and is shown to include a screen update portion 32 and a screen refresh portion 34. The screen update portion 32 includes a color engine 36, a shading engine 22, an index-to-direct look-up table (CLUT) 38, a multiplier circuit 24, and a back buffer 40. Unlike the direct color system 10, the color engine 36 of the indexed system provides an indexed pixel value (shown as CLUT8). This value is input to the CLUT 38 which generates a corresponding RGB pixel value (shown as CR, CG and CB). As in the direct color system, the shading engine generates corresponding lighting modulation values (LR, LG, LB), which operate on their corresponding CR, CG, and CB component in the multiplier circuit 24 to generate a direct color value pixel (RGB). This value is written to the back buffer 40. The screen refresh portion 34 reads data from a front buffer 42 to a DAC 26.

A drawback of the indexed color system is that the displayed images degrade considerably when displayed with indexed color systems, due to the limited number of colors available in the palette. Further, in the indexed color system the CLUT 38 must typically be realized as a high speed RAM with $2^{bpp}$ entries (where bpp is bits per pixel). Accordingly, a larger size CLUT requires more area on an integrated circuit.

It is known in the prior art to simplify the lighting modulation operation by having the shading engine generate only white light modulation values. In such a case, the same lighting modulation value (L) is applied to all three color components of the color pixel (i.e., L=LR=LG=LB).

While prior art approaches have efficiently handled non-rendered data, which employ direct color or indexed color without shading or other effects, they have not optimally processed rendered data to obtain the greatest resolution and color quality with the least memory usage.

SUMMARY OF THE INVENTION

It is an object of the present invention to provide a computer graphics system for animated rendering applications having a reduced memory requirement.

It is a further object of the present invention to provide a double-buffered computer graphics system that has a back buffer of reduced size.

It is a further object of the present invention to provide a computer graphics system for rendering applications employing a front buffer and back buffer of reduced size.

A computer graphics system according to the present invention includes a render look-up table (RLUT), a color engine, and a lighting engine. The color engine generates pixels in an n-bit RLUT indexed format (RLUTn), while the lighting engine produces an m-bit lighting modulation value (Lm). The RLUT indexed pixel value and lighting modulation values of the same pixel are written to the back buffer together in a single combined format (RLUTnLm). The RLUTnLm format uses fewer bits per pixel for representing the same rendered image than prior art approaches at equivalent quality. As a result, the size of the back buffer is reduced.

According to an aspect of the present invention, the contents of the back buffer are copied to the front buffer by a look-up and multiply bit block transfer (LMBLT) operation. The LMBLT applies the RLUTn index to the render look-up table to generate corresponding CR, CG and CB values. Further, the LMBLT multiplies each of the CR, CG, CB components by the Lm value to generate lighting modified pixel data (RGB). The LMBLT concludes by writing the RGB pixel to the front buffer.

According to another aspect of the present invention pixel data are stored in the RLUTnLm format in both the front buffer and the back buffer. The two buffers are swapped in a conventional manner. A look-up-and-multiply digital-to-analog converter (LMDAC) converts the RLUTnLm values into RGB pixel values in a similar fashion to the LMBLT operation described above. The RGB values are received by a conventional DAC portion of the LMDAC to generate analog monitor signals. Both the back buffer and front buffer sizes are thus reduced in size.

According to another aspect of the present invention, an additional engine generates another parameter to further define pixel color, known as a fog value (Fo). Data are stored in a combined RLUTnLmFo format. A look-up-multiply and add BLT (LMABLT) or look-up-multiply and add DAC (LMADAC) is employed to generate lighted and fogged modified pixel values.

Other objects and advantages of the invention will become apparent in light of the following description thereof.

BRIEF DESCRIPTION OF THE DRAWING

FIG. 7 is block diagram illustrating a look-up multiply and add bit block transfer according to the second alternate embodiment.

FIG. 8 is block diagram illustrating a memory storage scheme of a preferred embodiment.

DETAILED DESCRIPTION OF THE EMBODIMENTS

Figure 1:
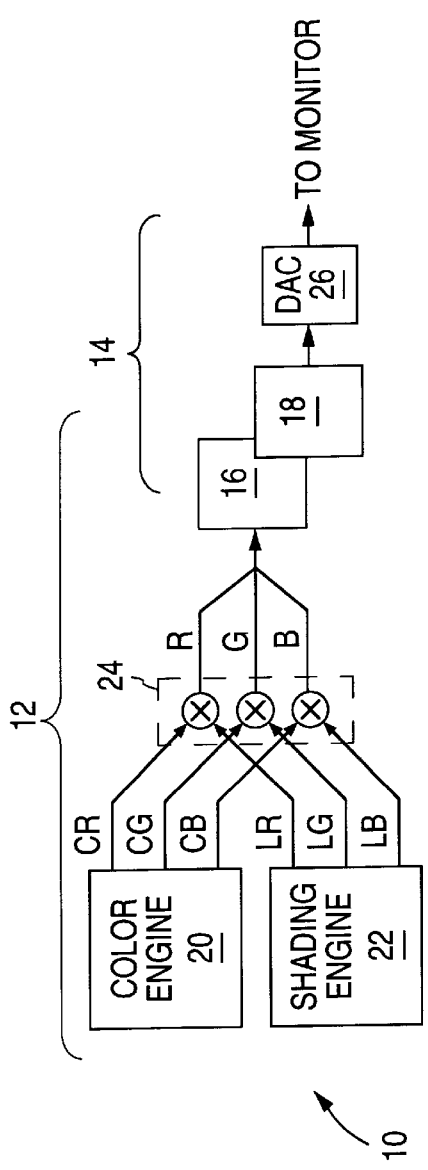
FIG. 1 is a block diagram illustrating a prior art direct color graphics system.
Figure 2:
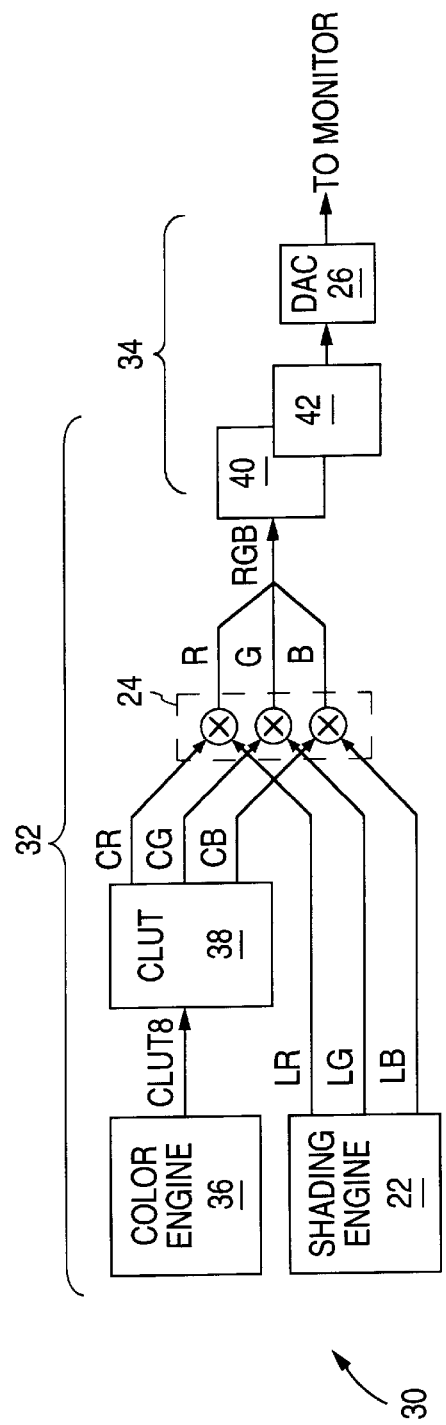
FIG. 2 is a block diagram illustrating a prior art indexed color graphics system.
Figure 3:
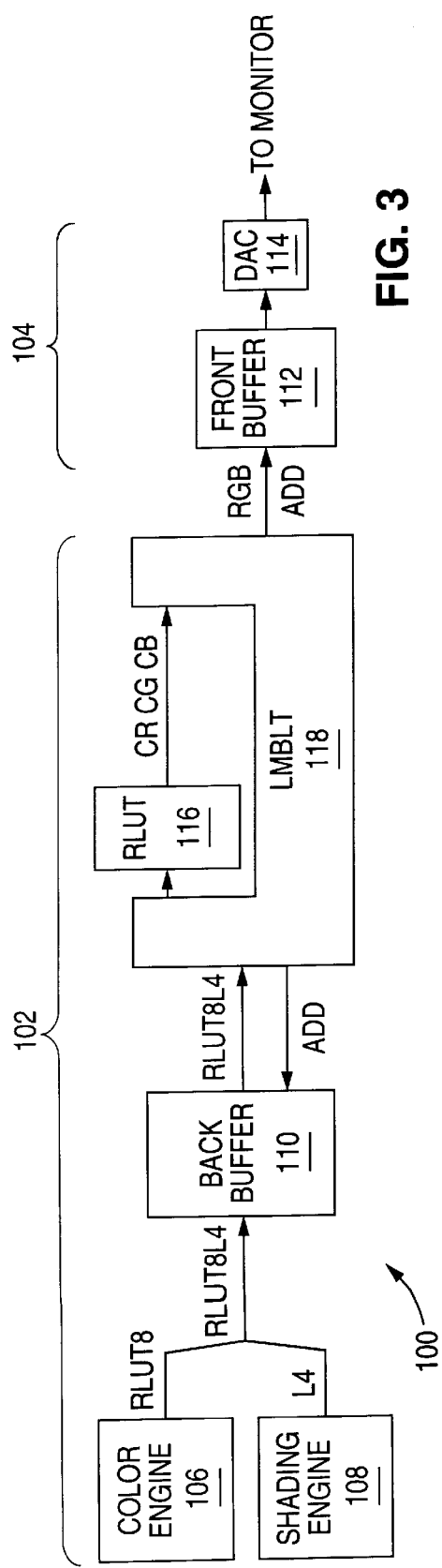
FIG. 3 is a block diagram illustrating computer graphics system according a preferred embodiment of the present invention.

A graphics system according to a preferred embodiment of the present invention is set forth in FIG. 3 and designated by the general reference character 100. The graphics system 100 includes a display update portion 102 and a display refresh portion 104. The display update portion 102 includes a color engine 106, a shading engine 108, and a back buffer 110. The display refresh portion 104 is shown to include a front buffer 112, and a digital-to-analog converter (DAC) 114. It is understood that the front and back buffers (110 and 112) are typically different address ranges within a single frame buffer memory. The system 100 further includes a render look-up table (RLUT) 116 and a look-up-and-multiply bit block transfer (LMBLT) engine 118 that transfers data from the back buffer 110 to the front buffer 112.

The color engine 106 provides a series of fully lit indexed pixel values as an output. In a preferred embodiment the color engine 106 is a texture mapper that provides a series of eight bit indexed pixel values (shown as RLUT8). The texture mapper is part of a multimedia accelerator integrated circuit (IC). It is understood that the color engine 106 could generate RLUT8 values according to other well known rendering methods, including, but not limited to, solid color generation, parametric color generation, ray tracing, or a copy from an offscreen portion of memory. Further, the color engine 106 could be realized by dedicated hardware, or by a software algorithm provided directly from a host application program. Such techniques and apparatuses are well understood in the art and not critical to the present invention, and so will not be discussed in any further detail herein. All that is required for the present invention is that an image be generated in a format that consists of a plurality of indexed pixel values.

Concurrently with the color engine 106, the shading engine 108 generates a lighting value for each pixel generated by the color engine 106. The shading engine 108 includes a lighting model that assumes white light (i.e. uniform modulation of the red, green, and blue components of each pixel), and so one lighting value, as opposed to three, is generated for each indexed pixel. In the preferred embodiment, the shading engine 108 is a lighting interpolator that generates a four bit lighting modulation value (shown as "L4" in FIG. 3). Like the color engine 106 described above, the lighting interpolator is incorporated into a multimedia accelerator IC. This particular implementation should not be construed as limiting the present invention thereto. Other lighting methods could be employed by the shading engine 108, including but not limited to, flat shading or "Phong" shading. Further, like the color engine 106, the shading engine 108 could be implemented by host software.

In this manner, for each pixel rendered in the system, a color index value and corresponding lighting value are generated. These values are combined into a combined pixel format in the back buffer 110. In the preferred embodiment, the combined format, shown as RLUT8L4, requires twelve bits per pixel (12 bpp) as opposed to 16 bpp used in comparable image quality direct color systems (assumed to be RGB555 for this description).

The pixel values of the back buffer 110 are converted into RGB format, modulated by their respective lighting values, and transferred to corresponding front buffer 112 locations when the host invokes the LMBLT 118 engine.

Figure 4:
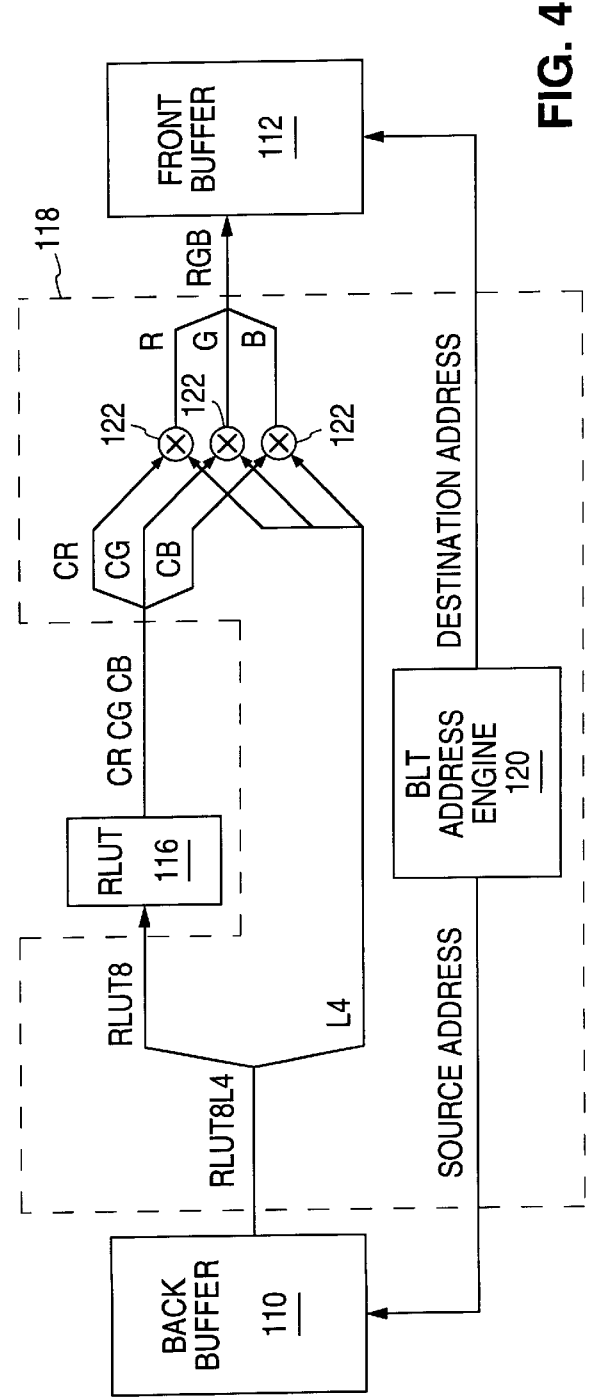
FIG. 4 is block diagram illustrating a look-up and multiply bit block transfer engine according to a preferred embodiment.

Referring now to FIG. 4, a block diagram is set forth illustrating a LMBLT engine 118 according to a preferred embodiment. Using well understood methods, a BLT address engine 120 generates a series of source addresses corresponding to back buffer 110 pixel locations (each storing at least one RLUT8L4 value). According to the source addresses, the back buffer pixel values are read from the back buffer 110. Unlike conventional bit block transfers, where the data from the source addresses are copied to a destination address either immediately or after one or more raster operations, in the present invention RGB value lookup and lighting modulation also take place. The RLUT8 index portion of the back buffer 110 pixel value is applied to the RLUT 116 to generate corresponding CR, CG, and CB values. CR/CG/CB is a 16-bit RGB value in the preferred embodiment. Each color component of the CR/CG/CB value is multiplied by the lighting value provided by the shading engine 108 to generate a lighting modulated pixel value (shown as RGB). As set forth in the figure, the lighting modulation of the preferred embodiment is accomplished by three multiply circuits 122, where each of the five bit color components is multiplied by the four bit lighting value (L4). The lighting modulated RGB value is then written to the front buffer 112 (in 16 bpp RGB format) according to a destination address provided by the BLT address engine 120.

In a preferred embodiment, the BLT address engine 120, RLUT 116 and multipliers 122 are provided by dedicated hardware in a multimedia accelerator IC. One skilled in the art would recognize that the LMBLT could also be accomplished in software or firmware using a more general purpose processor.

Figure 5:
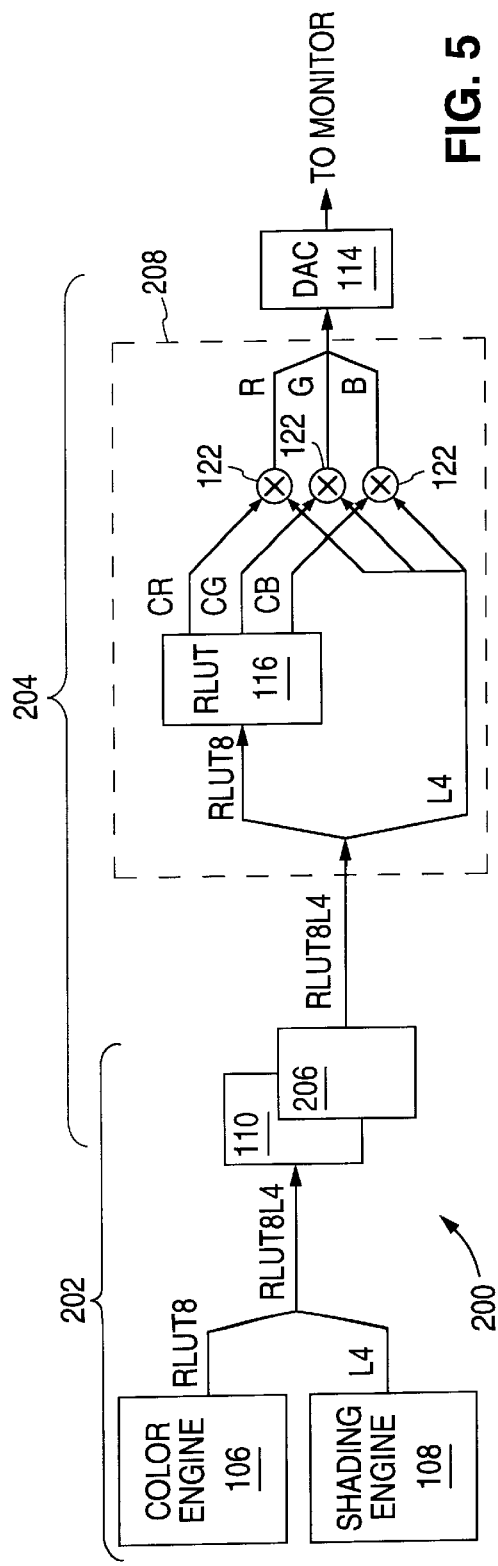
FIG. 5 is a block diagram illustrating a computer graphics system according to a first alternate embodiment.

A first alternate embodiment of the present invention is illustrated in FIG. 5. The alternate embodiment includes elements described in the previous embodiment, and to that extent, like elements will be referred to by the same reference character. The first alternate embodiment 200, like the preferred embodiment 100 of FIG. 3, is shown to include a display update portion 202 and a display refresh portion 204. The display update portion 202 includes a color engine 106, a shading engine 108, and back buffer 110.

The display refresh portion 204 includes a front buffer 206, but differs from the previously described embodiment in that pixel data are stored in the front buffer 206 in the combined RLUT8L4 format (i.e. both the front buffer 206 and back buffer 110 store pixel data in the combined RLUT8L4 format). Hence, instead of a LMBLT engine 118 operation transferring data from the back buffer 110 to the front buffer 206, conventional double buffering techniques are used to swap the front buffer 110 with the back buffer 206 (i.e. a pointer to the display memory base address will change at vertical refresh so that the back buffer becomes the front buffer and visible, while the "old" front buffer is now not visible and available for use as the "new" back buffer).

During display refresh, RLUT8L4 data are output from the front buffer 206 into a look-up-and-multiply DAC (LMDAC) 208. The LMDAC 208 converts the RLUT8L4 data directly into analog display control signals.

Referring once again to FIG. 5, the LMDAC 208 is shown in a block diagram. The combined RLUT8L4 data of the front buffer 206 are processed down two different paths. The look-up table values (RLUT8) are applied to an RLUT 116 to generate fully lit RGB color components, CR, CG, and CB. Each color component is modulated by the lighting value (L4) at multipliers 122 to generate lighting modified RGB values (RGB). These values are applied directly to a conventional DAC 114 to generate analog display control signals. The preferred implementation of the LMDAC 208 is as an integral portion of a multimedia accelerator IC.

Figure 6:
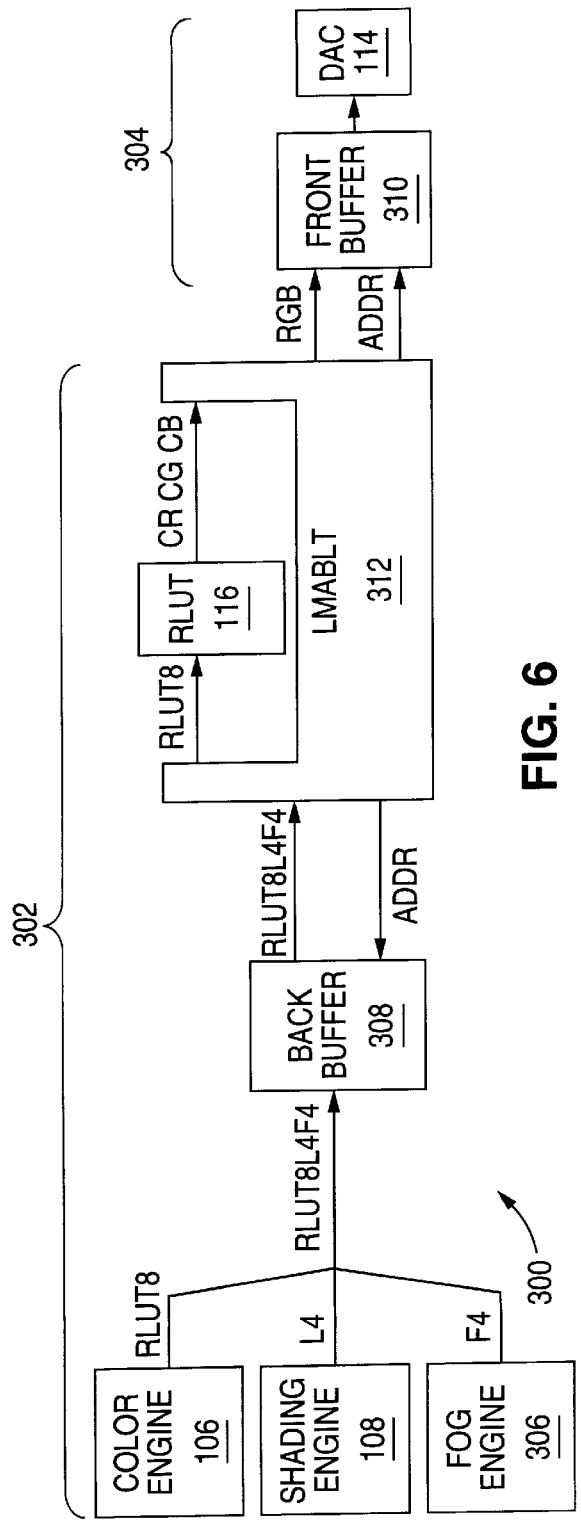
FIG. 6 is block schematic diagram illustrating a computer graphics system according to a second alternate embodiment.

A second alternate embodiment of the present invention is illustrated in FIG. 6, and is designated by the general reference character 300. The second alternate embodiment 300 includes a display update portion 302 and a display refresh portion 304. As shown set forth in FIG. 6, the second alternate embodiment 300 includes many of the same elements of the embodiment set forth in FIG. 3; a color engine 106, a shading engine 108, an RLUT 116, and a DAC 114. The second alternate embodiment 300 differs from the previously described embodiments in that the display update portion includes a fog engine 306. In a similar fashion to the shading engine 108, the fog engine 306 generates a fog value (shown as F4) that corresponds to an indexed pixel value from the color engine 106. Thus, in the second alternate embodiment 300, for each rendered pixel there is a fully lit indexed pixel value (RLUT8), a lighting modulation value (L4) and a fog value (F4). These three corresponding values are written in a combined 16-bit format (RLUT8L4F4) into a back buffer 308.

The contents of the back buffer 308 are transferred to a front buffer 310 by a look-up multiply and add bit block transfer (LMABLT) operation 312. The LMABLT operation 312 reads the combined RLUT8L4F4 format from the back buffer 308 and generates therefrom an RGB pixel value, which is then written to the front buffer 310. The RGB pixel value as read from the front buffer 310 is applied to the DAC 114 to generate analog display control signals.

Referring now to FIG. 7, the LMABLT operation 312 is set forth in more detail. In a similar fashion to the LMBLT operation, during the LMABLT operation 312 a BLT address engine 120 generates a series of source addresses located in the back buffer 308, and corresponding destination addresses located in the front buffer 310. The combined format data (RLUT8L4F4) is read from the back buffer 308 and the indexed color value applied to the RLUT 116. The RLUT 116 provides the fully lit color components (CR, CG, CB) corresponding to the fully lit indexed value. Each color component is applied to one input of a separate multiplier 122. The other inputs of the multipliers 122 receive the lighting modulation value L4. The output of each multiplier 122 is applied to one input of an adder 314. The other input of each adder 314 receives the fog value, F4. The output of each adder 314 is applied to a saturation circuit 316. The saturation circuit 316 ensures that after the multiply and add operations, none of the resulting eight bit color component values exceeds the maximum value of 255. Saturation operations are well understood in the art. The output of the saturation circuits 316 are combined to provide a 24-bit RGB DAC input value.

One skilled in the art would recognize that other pixel operations in addition to, or in place of, the single multiply lighting modulation and single additive fog operation set forth in various embodiments would be obvious in light of the teaching set forth herein. Operands would be stored in a combined format with an indexed color value in either the back buffer, or both the front and back buffers. The indexed color value would be converted to an RGB format and the value applied by an operation incorporated into a bit block transfer operation, as illustrated in the LMBLT 118 and LMABLT 314 cases, or a circuit coupled to a DAC, as illustrated in the LMDAC 208 case. Such an operation, or combination of operations, is not limited to a multiply and/or add. Subtracts, divides and shifting operations are just a few of the possible pixel operations that could be incorporated by the present invention.

In a preferred embodiment, to ensure a compact arrangement of the 12 bpp data in the back buffer 110, the display memory is arranged in a byte wide planar mode. Referring now to FIG. 8, a block diagram of a display memory 400 is set forth. Eight bit memory locations are illustrated with their accompanying addresses. The display memory 400 is addressed as four, eight bit planes. The first eight bit plane begins at memory location 0000, the second at 4000, the third at 8000, and the fourth at C000. The first three memory planes are dedicated to storing display image data in RLUT8L4 format, and are designated in FIG. 8 by the symbol "FB" for frame buffer. Addresses above C000 represent a fourth plane which stores off-screen data in "standard" 4-, 8-, 16- or 32-bit pixel formats (i.e. indexed texture maps, etc.). This portion of the memory is shown as "OFF" in FIG. 8

It is understood that the present invention has been described in connection with its preferred embodiments, and may be changed, and other embodiments derived, without departing from the spirit and scope of the invention. The above disclosure is not intended to be limiting and the appended claims are to be interpreted as encompassing the entire scope of the invention.

What I claim is:

1. A computer graphics system for rendered graphics, the system comprising:

an indexed color engine that generates indexed pixel values, each indexed pixel value having X bits;

at least one pixel operand engine that generates operand values such that each operand value generated by the pixel operand engine corresponds to an indexed pixel value generated by the indexed color engine, each operand value having Y bits;

a back buffer having a plurality of back buffer storage locations that store combined format data values having Z bits, where Z=(X+Y), as a result of an operand value and an indexed pixel value corresponding to said operand value being stored adjacent to each other in an individual back buffer storage location; and at least one render look-up table that responds to an indexed pixel value applied to the render look-up table from a combined format data value that is stored in the back buffer and includes said indexed pixel value by providing corresponding color pixel data.

2. A computer graphics system as in claim 1, and wherein the pixel operand engine comprises a shading engine that generates a lighting modulation operand value having Y bits for each indexed pixel value generated by the indexed color engine.

3. A computer graphics system for rendered graphics, the system comprising:

an indexed color engine that generates indexed pixel values, each indexed pixel value having X bits;

a shading engine that generates a corresponding lighting modulation value for each indexed pixel value generated by the indexed color engine, each lighting modulation value having Y bits;

a fog engine that generates a corresponding additive fog value for each indexed pixel value generated by the indexed color engine, each additive fog value having W bits;

a back buffer having a plurality of back buffer storage locations that store combined format data values having Z bits, where Z=(W+X+Y), as a result of an indexed pixel value, a corresponding lighting modulation value and a corresponding additive fog value being stored adjacent to each other in an individual back buffer storage location; and at least one render look-up table that responds to an indexed pixel value applied to the render look-up table from a combined format data value that is stored in the back buffer and includes said indexed pixel value by providing corresponding pixel data.

4. A computer graphics system for rendered graphics, the system comprising:

an indexed color engine that generates indexed pixel values, each indexed pixel value having X bits;

at least one pixel operand engine that generates a corresponding operand value for each indexed pixel value generated by the indexed color engine, each operand value having Y bits;

a back buffer having a plurality of back buffer storage locations that store combined format data values having Z bits, where Z=(X+Y), as a result of an indexed pixel value and a corresponding operand value being stored adjacent to each other in an individual back buffer storage location;

at least one render look-up table that responds to indexed pixel values applied to said render look-up table by providing corresponding color pixel data;

a look-up and modify bit block transfer engine that reads a combined format data value from the back buffer and applies the indexed pixel value included in said combined format data value to the render look-up table, the look-up and modify bit block transfer engine including a modify functional element that operates on the color pixel data provided by the render look-up table in response to said indexed pixel value and on the corresponding operand value included in said combined format data value to provide an operand modulated pixel value.

5. A computer graphics system as in claim 4, and wherein the modify functional element comprises a multiplier that multiplies said color pixel data and said corresponding operand value to provide the operand modulated pixel value.

6. A computer graphics system as in claim 4, and further comprising:

a front buffer that has a front buffer storage location corresponding to each back buffer storage location and that receives operand modulated pixel values from the look-up and modify bit block transfer for storage in the front buffer.

7. A computer graphics system as in claim 6, and further comprising:

a digital-to-analog converter (DAC) that receives operand modulated pixel values from the front buffer and generates corresponding analog display control signals.

8. A computer graphics system as in claim 6, and wherein the look-up and modify bit block transfer engine further includes an address engine that generates source addresses for combined format data values for reading combined format data values from the back buffer, and that generates destination addresses for operand modulated pixel values for storing operand modulated pixel values in the front buffer.

9. A computer graphics system as in claim 4, and wherein the modify functional element comprises an adder that adds said color pixel data and said corresponding operand value to provide the operand modulated pixel value.

10. A computer graphics system for rendered graphics, the system comprising:

at least one render look-up table that responds to indexed pixel values applied to said render look-up table by providing corresponding color pixel data;

an indexed color engine that generates indexed pixel values, each indexed pixel value having X bits;

at least one pixel operand engine that generates a corresponding operand value for each indexed pixel value generated by the indexed color engine, each operand value having Y bits;

a back buffer having a plurality of back buffer storage locations that store combined format data values having Z bits, where Z=(X+Y), as a result of an indexed pixel value and a corresponding operand value being stored adjacent to each other in an individual back buffer storage location;

a look-up and modify converter that responds to combined format data values received from the back buffer by generating corresponding modulated pixel data;

a front buffer that receives modulated pixel data from the look-up and modify converter for storage in the front buffer; and a digital-to-analog converter (DAC) that receives modulated pixel data from the front buffer and generator corresponding analog display control signals.

11. A computer graphics system as in claim 10, and further comprising:

switching means for switching the front buffer and the back buffer such that the front buffer functions as the back buffer and the back buffer functions as the front buffer.

12. A method of storing a combined format pixel value, the method comprising:

generating an indexed pixel value having X bits;

generating an operand value corresponding to the indexed pixel value, the operand value having Y bits; and storing the indexed pixel value and the operand value adjacent to each other in an individual storage location to provide a stored combined format pixel value having Z bits, where Z=(X+Y).

and wherein the storing step comprises storing the combined format pixel value in one memory location in a back buffer memory, reading the combined format data value from the back buffer memory;

utilizing the indexed pixel value portion of the combined format data value read from the back buffer memory to generate a corresponding color pixel data value utilizing a render look-up table; and modulating the color pixel data value utilizing the operand value portion of the combined format data value read from the back buffer to generate modulated pixel data.

13. A method as in claim 12, and wherein the modulating step comprises multiplying the color pixel data value by the operand value.

14. A method as in claim 12, and wherein the modulating step comprises adding the operand value to the color pixel data value.

15. A method as in claim 12, and wherein the modulating step includes assigning a limit to the modulated pixel data.

16. A method as in claim 12, and further comprising:

storing the modulated pixel data in a front buffer; and generating analog display signals based upon the modulated pixel data stored in the front buffer.

* * * * *